United States Patent [19]

Ottone

[11] Patent Number: 5,177,847
[45] Date of Patent: Jan. 12, 1993

[54] TOOL FOR REMOVING BALANCE WEIGHTS FROM A TURBINE

[75] Inventor: Didier Ottone, La Chapelle Gauthier, France

[73] Assignee: Societe Nationale d'Etude et de Construction de Moteurs d'Aviation "S.N.E.M.C.A.", Paris, France

[21] Appl. No.: 756,878

[22] Filed: Sep. 9, 1991

[30] Foreign Application Priority Data

Sep. 5, 1990 [FR] France .................................. 90 11004

[51] Int. Cl.⁵ .............................................. B23P 11/00
[52] U.S. Cl. ..................... 29/243.56; 29/239; 254/131
[58] Field of Search .................. 29/243.56, 243.5, 239, 29/267, 270; 254/131; 16/115

[56] References Cited

U.S. PATENT DOCUMENTS

| 2,274,126 | 2/1942 | Carrigan | 254/131 |
| 2,883,153 | 4/1959 | Abbott et al. | 254/131 |
| 3,822,468 | 7/1974 | Mueller | 29/268 |
| 3,985,465 | 10/1976 | Sheldon et al. | 415/189 |
| 4,043,147 | 8/1977 | Wiebe | 64/1 V |
| 4,530,310 | 7/1985 | Clarke | 273/84 R |
| 4,708,510 | 11/1987 | McConnell et al. | 403/137 |
| 4,999,898 | 3/1991 | Schmeling | 29/243.56 |

FOREIGN PATENT DOCUMENTS 2726540 12/1978 Fed. Rep. of Germany .
1081605 8/1967 United Kingdom .

Primary Examiner—Bruce M. Kisliuk
Assistant Examiner—Eileen P. Morgan
Attorney, Agent, or Firm—Oblon, Spivak, McClelland, Maier & Neustadt

[57] ABSTRACT

A tool for removing balance weights attached to the head platform of the blades of a turbine comprises a jointed arm which can be introduced through the exhaust nozzle of the turbine without any disassembly, the arm having a handle portion which is held by the operator carrying out the removal operation, and a distal part which is steerable by movements imparted to the handle portion by the operator, the distal part being dislocatable and articulated with respect to said handle portion and ending in a claw adapted to grip the balance weight and to unseat it without letting it go in response to appropriate movements of the handle portion.

6 Claims, 3 Drawing Sheets

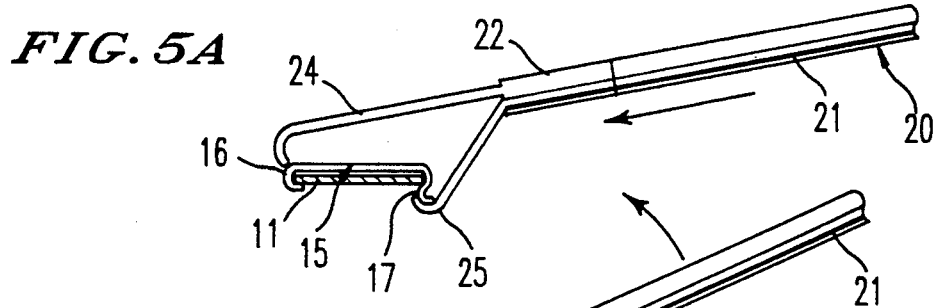
FIG.5A
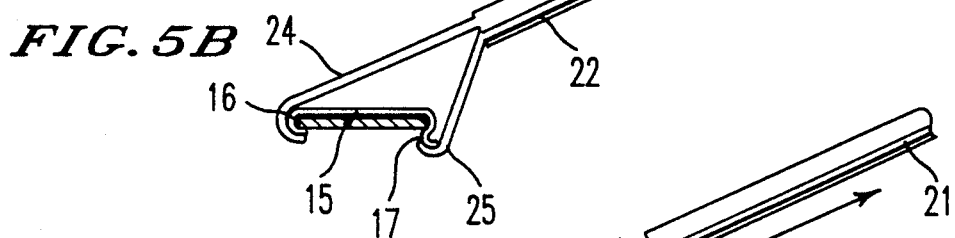
FIG.5B
FIG.5C
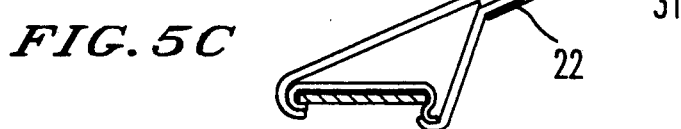
FIG.5D
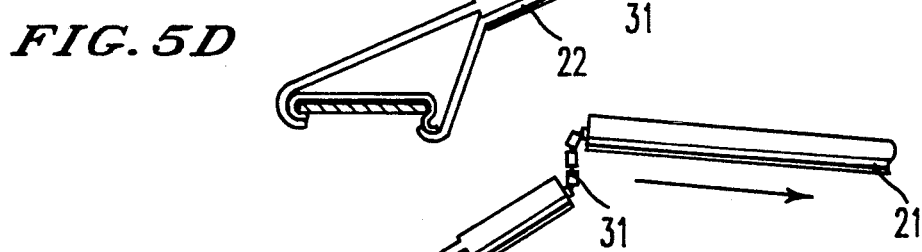
FIG.5E
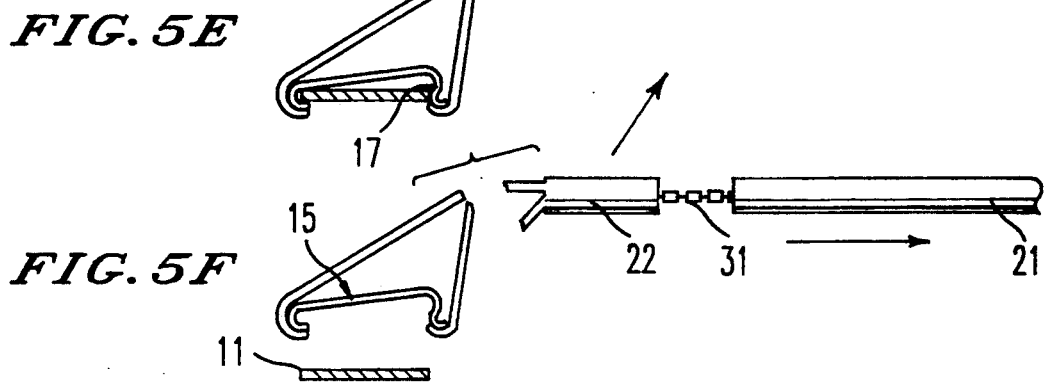
FIG.5F

TOOL FOR REMOVING BALANCE WEIGHTS FROM A TURBINE

BACKGROUND OF THE INVENTION

1. Field of the invention

The invention relates to a tool for removing balance weights attached to the periphery of a rotor wheel of a turbine.

The invention is applicable to the removal of balance weights from any turbine requiring maintenance or rebalancing of the turbine on the engine bed, the turbine remaining fitted with its exhaust nozzle, and is Particularly applicable in the field of avionics to turbojet engines requiring regular maintenance, for which the intervention time must be as short as possible.

2. Summary of the Prior Art

The rotor of a turboshaft engine rotates at speeds such that the slightest imbalance may lead to extremely harmful vibrations. To prevent such vibrations it is therefore necessary to balance the rotor. Generally, thin balance weights are crimped in place at the head of a blade. In the case of the low-pressure turbine of CFM56 engines, for example, small balance weights are placed between two blade platforms at the periphery of the fourth stage wheel.

When attending to an aircraft engine in the course of maintenance, it is sometimes necessary to rebalance the turbine without any particular disassembly. For this purpose, a tool is used for placing and crimping the balance weights between two blades, on the inside of the peripheral rim formed by the heads of the rotor blades, the tool being introduced through a nozzle.

While the placing and crimping of such balance weights through the nozzles of the turboshaft engine is relatively easy, this is not the case for the reverse operation, which involves unseating and removing the weights from the peripheral rim, as the risk of dropping a weight in the engine during this operation is considerably greater. When a balance weight which has just been unseated falls between two stages of the turbine, there is no other option but to dismantle the nozzle in order to recover the weight.

A tool exists which permits the placing and crimping of weights on the periphery of a turbine wheel without having to dismantle the nozzle, but at present there is no tool able to perform the reverse operation in a sufficiently reliable manner. Accordingly, it is usual for the nozzle to be dismantled to carry out the removal of balance weights.

SUMMARY OF THE INVENTION

The aim of the present invention is to solve this problem by providing a simple unseating and extraction tool which requires no disassembly of the turbine.

To this end, according to the invention there is provided a tool for removing a balance weight attached to the head platform of the blades of a turbine, said tool comprising a jointed arm adapted to be introduced into said turbine through a nozzle thereof without any disassembly, said jointed arm comprising a handle portion which is arranged to be held by the operator carrying out the removal operation, a distal part steerable by movements imparted to said handle portion by said operator, and a claw carried by said distal part at the end thereof, said claw being adapted to grip said balance weight and to unseat it without letting it go in response to appropriate movements of said handle portion.

In one embodiment, said distal part is dislocatable from said handle portion, and said arm includes a chain mechanically interconnecting said distal part and said handle portion to permit telescopic and pivotal movements of said distal part and said handle portion relative to each other.

In this case the handle portion and the distal part of the arm are preferably formed by hollow rods, and the chain is housed inside the hollow rods.

In another embodiment, the joint between the handle portion and the distal part of the arm is formed by means of an universal joint.

Preferably, the claw is integral with the distal part of the arm. The claw may have first and second fingers adapted to fit respectively around first and second hooks of the balance weight by which the weight is attached to the blade head platform. In the case of the first embodiment at least, the operator removes the weight by pushing said arm to engage said second finger under said second hook, raising the handle portion to rock said arm and engage said first finger under said first hook, pulling said handle portion to dislocate it from said distal part, pushing the handle portion in a direction substantially at right angles to the longitudinal axis of said handle portion to release said second hook of said balance weight from said head platform, and finally pushing said handle portion longitudinally to release said first hook from said head platform, said balance weight remaining held by said claw.

Other features and advantages of the invention will become apparent from the following description of a preferred embodiment, given by way of example, and with reference to the attached drawings.

BRIEF DESCRIPTION OF THE DRAWINGS

FIGS. 5A to 5F are diagrammatic views of the tool illustrating different stages of its use in removing a balance weight from a turbine wheel.

DESCRIPTION OF THE PREFERRED EMBODIMENT

Figure 1:
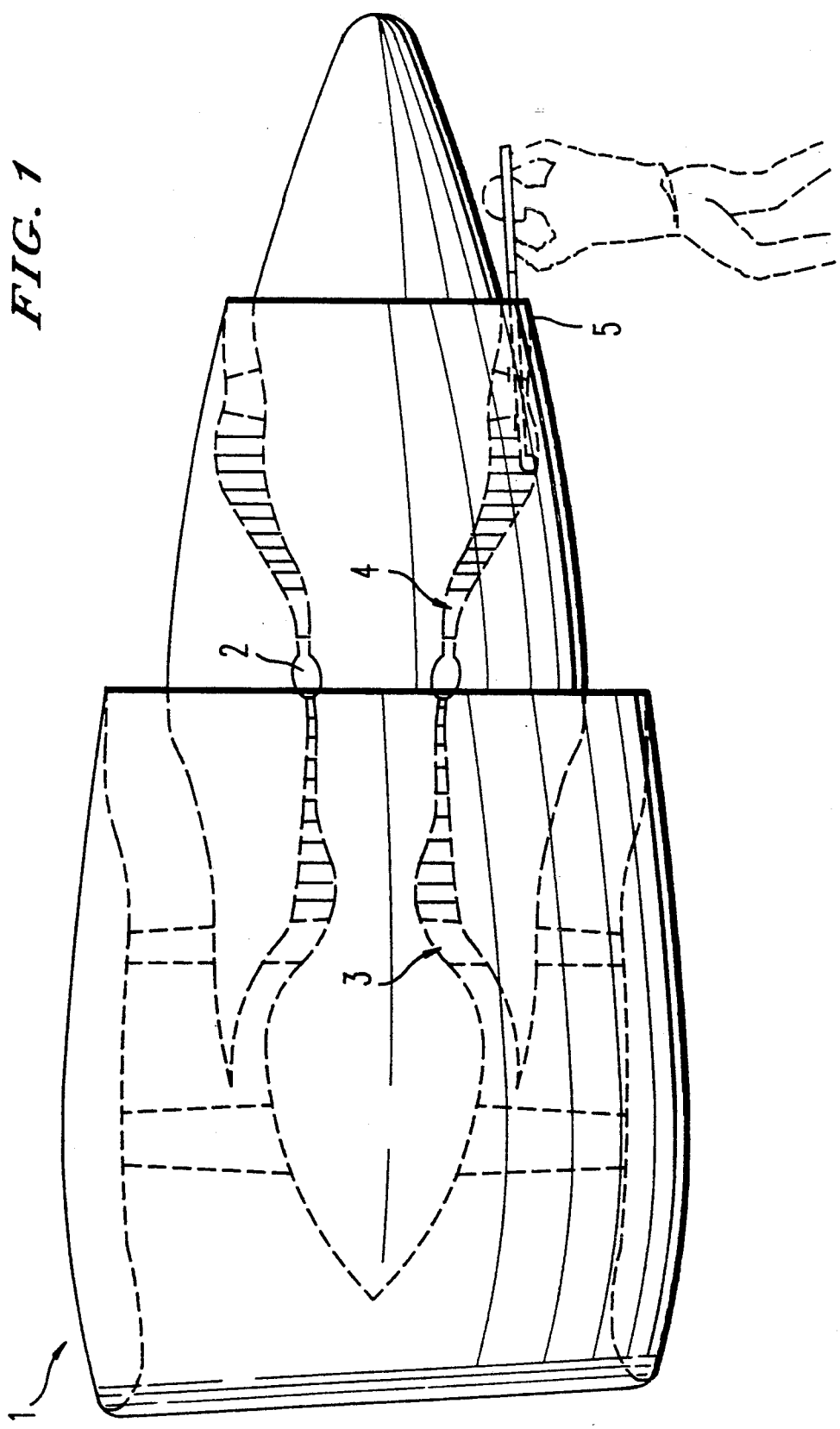
FIG. 1 shows a simplified diagram of a turbojet engine illustrating the use of a tool in accordance with the invention.

FIG. 1 illustrates generally one example of a turbojet engine with which the tool in accordance with the invention may be used, the drawing showing the engine nacelle 1, the combustion chambers 2, the compressor stages 3, the turbine stages 4, and the exhaust nozzle 5.

Figure 2:
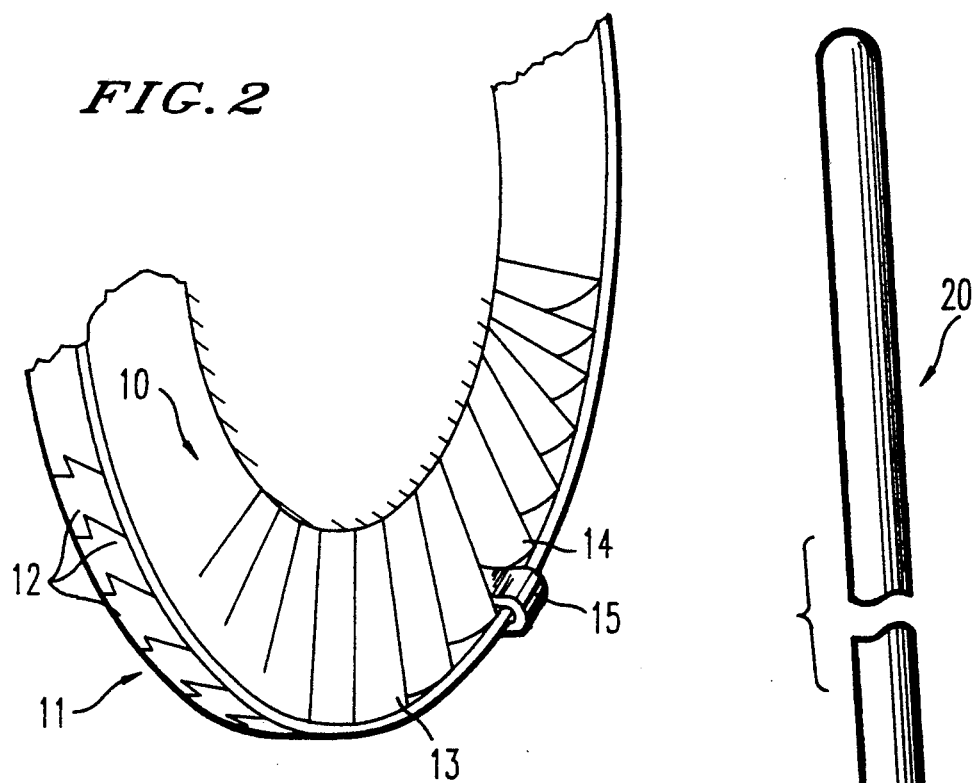
FIG. 2 is a diagrammatic view of part of a turbine wheel showing the position of a balance weight on the periphery of the wheel.

Shown in FIG. 2 is a portion of the periphery 11 of a turbine wheel 10 on which a balance weight 15 is fitted between two blades 13 and 14. The balance weight 15 is crimped on the head platforms 12 of the blades, the platforms constituting part of the periphery of the wheel.

Figure 3:
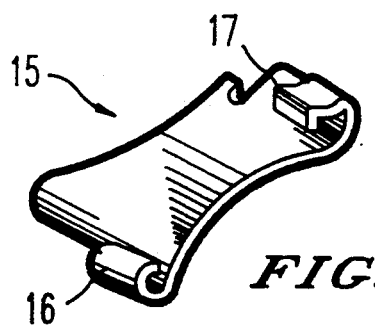
FIG. 3 is a view of a balance weight.

The balance weight 15 is shown more clearly in FIG. 3 and comprises two hooks 16, 17 for engaging over the edges of the platforms 12, one of the hooks 17 being crimped when fitting the weight 15 in order to secure the weight firmly in position.

It is therefore these two hooks 16,17 which it will be necessary to disengage from the platforms 12 in order to free the weight 15. For this purpose, it will be necessary first to move the crimped hook 17 away from the platforms, and then to disengage the hook 16, and it is desirable to do this without letting the weight 15 go and without disassembly of the turbine.

Figure 4:
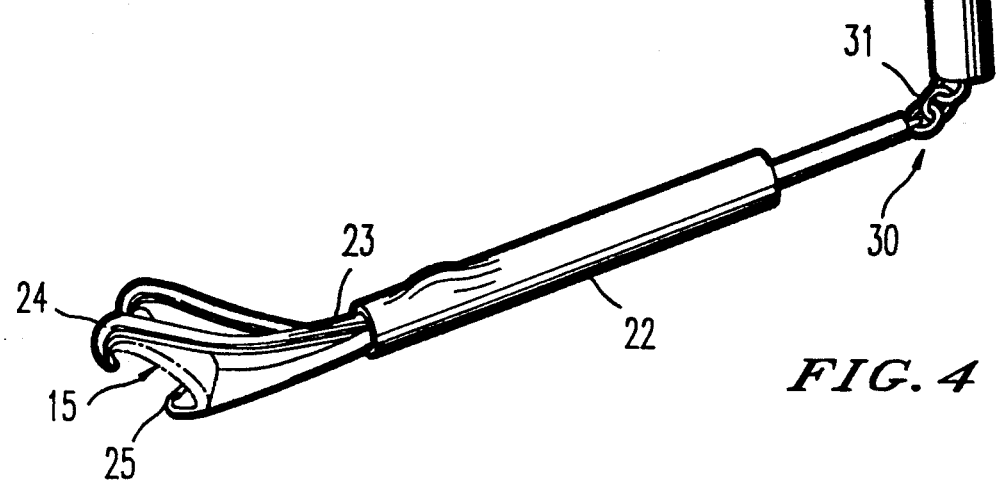
FIG. 4 is a perspective view of one embodiment of the tool in accordance with the invention.

The embodiment of the tool in accordance with the invention shown in FIG. 4 comprises a jointed arm 20, a part of which forms a handle 21 which may be held and guided by an operator, and another part of which, i.e. the distal part 22, is movable by movements imparted to the handle 21 by the operator.

The distal part 22 has a claw 23 which, when positioned near a balance weight 15 can be caused to grip the weight, uncrimp it from the periphery of the turbine wheel, and to remove it from the turbine without releasing it.

In this embodiment the arm 20 is telescopic, the distal part 22 being dislocatable from the handle 21 at the position of the joint 30 of the arm but remaining mechanically connected to the handle 21 by a chain 31 which permits articulation of the handle and the distal part relative to each other.

It will of course be appreciated that other embodiments may employ alternative means of articulation for the joint 30, for example a universal joint, especially of the ball release type, provided the same function is performed. The requirement is to be able to transmit to the claw the movements imparted to the handle in the direction of the longitudinal axis of the handle, and to be able to effect a change of axis.

In the embodiment shown, the handle 21 and the distal part 22 are formed by hollow rods, and the chain 31 is housed inside these rods. The chain 31 may be fixed to one of these two parts and have a return spring for enabling the distal part 22 to be relocated in the handle 21.

The claw 23 at the end of the arm 20 is integral with the distal part 22, but it may be formed separately and suitably secured to the distal part. This arrangement would make it possible to exchange the claw should it be necessary to remove weights having a different shape or size.

The claw 23 has two fingers 24,25 of shape and size related to the weights to be removed, the first finger 24 being able to be fitted around one of the hooks 16 of the weight, and the second finger 25 being able to be fitted around the second hook 17 of the weight.

FIGS. 5A to 5F show the tool 20 of FIG. 4 in different stages of an operation to uncrimp and remove a balance weight from a turbine using the tool.

At the start of this operation the tool is introduced through the exhaust nozzle 5 near the head platform of the blades, to a position where a balance weight is located between two of the blades.

At step A, the operator pushes the arm 20 to jam one of the two fingers 25 of the claw against the second hook 17 of the weight to be unseated, the finger sliding under the crimped edge of the weight in a right-to-left direction as shown in FIG. 5.

At step B, the tool is raised (in the direction of the arrow shown) so as to snap the first finger 24 of the claw under the curved edge of the weight, i.e. under the first hook 16.

At step C, since the clearance of the tool in the nozzle is small because of the presence of the jet cone, the handle 21 of the tool is pulled towards the operator so as to disengage it from the distal part 22 and to leave the two parts connected by the chain 31.

At step D, the operator pushes on the handle 21 in order to apply leverage to the arm to thereby uncrimp the balance weight and disengage it from the blade head platform.

At step E, the operator raises the handle to disengage the tool from the blading and at step F, the operator withdraws the tool and the weight through the nozzle in the direction of the arrows.

Steps C and D may be simplified if the telescopic system and the chain are replaced by a universal ball joint.

The tool as described thus permits speedy removal of balance weights from a turbine rotor with complete safety and without any particular disassembly, whether in the course of maintenance in airline workshops, or during testing (when it is a matter of rebalancing the turbine, fitted with its nozzle, on the engine bench). Because of its shape and design the tool allows operation through the exhaust nozzle of a turbine in spite of the small clearance which may be afforded in the nozzle because of the presence of the jet cone.

I claim:

1. A tool for removing a balance weight, the balance weight having a first hook at a first end of the balance weight securing it to a rotor wheel of a turbine and a second hook at a second end thereof securing it to said rotor wheel of said turbine, said tool comprising:

a jointed arm having a handle portion and a distal part joined to said handle portion at a joint;

a claw formed at an end of said distal part, said claw having a first finger for releasing said first hook of said balance weight and a second finger for releasing said second hook of said balance weight, wherein said first and second fingers are spaced from one another by a distance substantially equal to a distance between said first and second hooks, such that said claw is manipulable by said handle portion to unhook said second hook from said rotor wheel with said second finger and retain it within said second finger while said first hook is retained by said first finger.

2. A tool according to claim 1, wherein said distal part is dislocatable from said handle portion at said joint, and said arm includes a chain mechanically interconnecting said distal part and said handle portion to permit telescopic and pivotal movements of said distal part and said handle portion relative to each other at said joint.

3. A tool according to claim 2, wherein said handle portion and said distal part are formed by hollow rods, and said chain is housed inside said hollow rods.

4. A tool according to claim 2, wherein said claw is integral with said distal part of said arm.

5. The tool according to claim 4, wherein said first and second fingers are curved in substantially a J-shape.

6. The tool according to claim 4, wherein said first and second fingers are flexible enough to permit an enlargement of said distance between said fingers in response to hooking said second finger around said second hook and lifting on said handle portion.

* * * * *